UNITED STATES PATENT OFFICE.

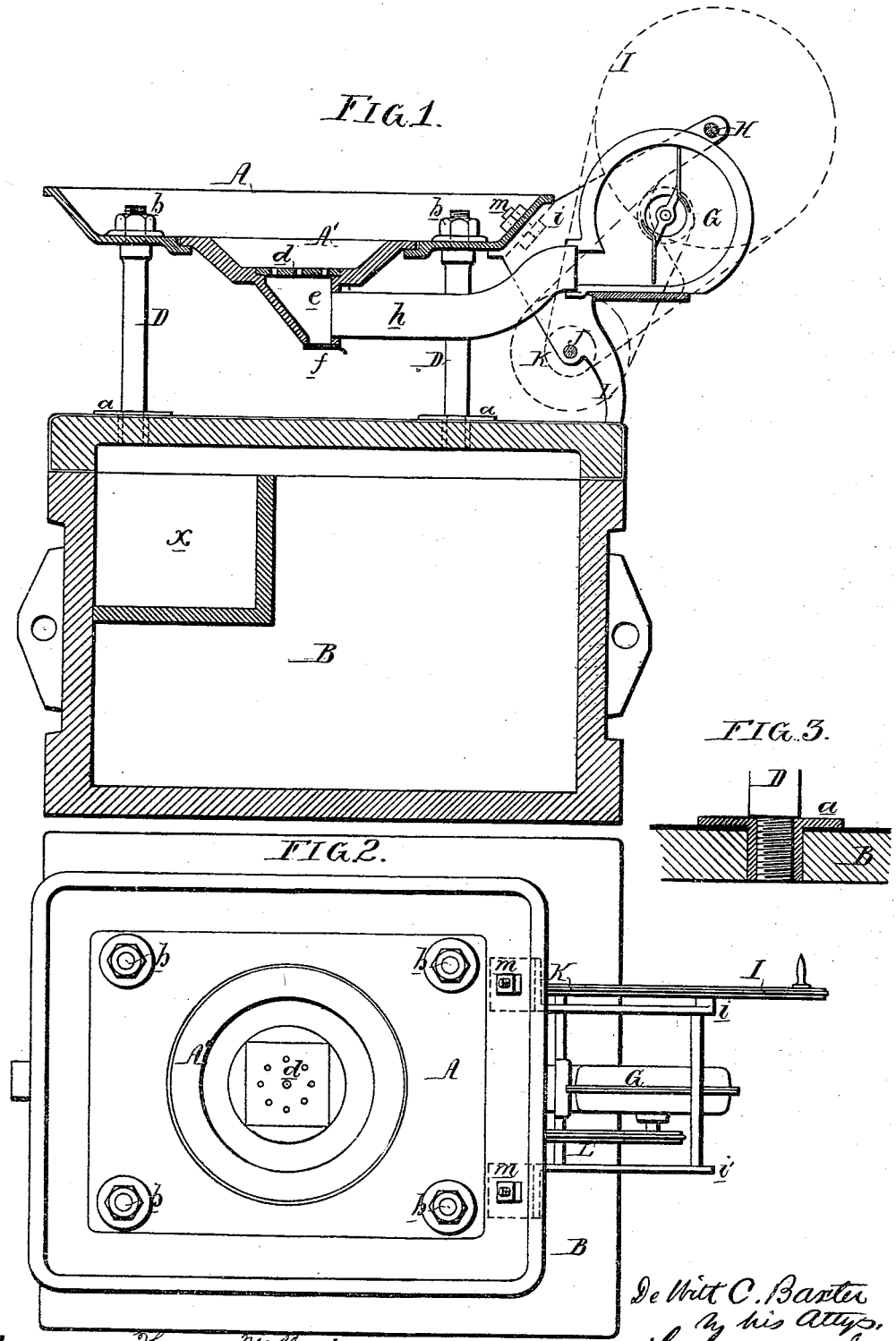

DE WITT C. BAXTER, OF PHILADELPHIA, PENNSYLVANIA, ASSIGNOR TO HIMSELF, CHARLES C. TORR, AND COCHRAN FORBES, OF SAME PLACE.

IMPROVEMENT IN FORGES.

Specification forming part of Letters Patent No. 148,652, dated March 17, 1874; application filed November 7, 1873.

*To all whom it may concern:*

Be it known that I, DE WITT C. BAXTER, of Philadelphia, Pennsylvania, have invented certain Improvements in Portable Forges, of which the following is a specification:

The object of my invention is the production of a portable forge, especially adapted for use on steamboats or for army purposes; and this object I attain by combining the hearth A with a chest, B, which shall serve as the base of the forge when the latter is in use, and shall be large enough to contain all the parts composing the forge, all as shown in the vertical section, Figure 1, and plan view, Fig. 2, of the accompanying drawing. The box B is similar to, and of about the same size, as the chests used by seamen, and into the lid of the box, which may, if desired, be covered with sheet-iron, are let and secured four threaded sockets, $a$, for the reception of the threaded lower ends of tubular wrought-iron pillars D, to the upper end of which the outer portion, A, of the hearth is secured by nuts $b$, the inner or central portion, A', of the hearth resting on ledges formed on the edge of an opening in the outer portion of the hearth, as shown in Fig. 1, and being at liberty to move laterally to a limited extent. This is an important feature, for the central portion is subjected to the greatest heat, and should be at liberty to expand independently of, and without affecting, the outer portion. This central portion of the hearth is depressed in the middle, the depression terminating at a detachable perforated plate, $d$, beneath which is a chamber, $e$, the bottom of the latter being closed by a small sliding door, $f$, on opening which the fine ashes, which have accumulated in the chamber, will escape. A detachable blast-pipe, $h$, communicates at one end with the chamber $e$, and at the opposite end with the fan, the latter being attached to frame-work composed of two connected side plates, $i$ $i'$. This frame-work carries the driving-shaft H and its large pulley I, and the counter-shaft J with its pulleys K and L, a band passing from the pulley I round the small pulley K on the counter-shaft, and another band from the pulley L round a small pulley on the fan-spindle. Two bolts, $m$ $m$, serve to secure the frame-work to the hearth, so that on withdrawing these bolts the fan, with all its driving appliances and frame, can be removed and placed in the chest, and may be again attached to the hearth ready for operation without any adjustment of pulleys or driving-bands. The chest is sufficiently large to admit the hearth and pillars D, as well as all other parts connected with the forge, and may also have a compartment, $x$, for the reception of blacksmiths' tools, so that the whole will be contained in a compact shape and form a portable forge, especially applicable to army use or to steamboats, owing to facility of transportation.

I do not claim, broadly, a hearth-plate depressed in the middle for the reception of a grate; but

I claim as my invention—

The fan G, frames $i$ $i$, shaft H, and counter-shaft J, with their respective pulleys and bands, all being self-contained and arranged for attachment to and detachment from the hearth-plate, as set forth.

In testimony whereof I have signed my name to this specification in the presence of two subscribing witnesses.

DE W. C. BAXTER.

Witnesses:
WM. A. STEEL,
HARRY SMITH.